US012117127B2

(12) United States Patent
Frenal

(10) Patent No.: US 12,117,127 B2
(45) Date of Patent: Oct. 15, 2024

(54) PACKAGING DEVICE, ASSEMBLY COMPRISING SUCH A DEVICE AND A CONTAINER, USE THEREOF AND A METHOD FOR FILLING OR WITHDRAWING

(71) Applicant: L'Air Liquide Société Anonyme pour l'Etude et l'Exploitation des Procédés Georges Claude, Paris (FR)

(72) Inventor: Antoine Frenal, Ezanville (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 203 days.

(21) Appl. No.: 17/763,830

(22) PCT Filed: Sep. 8, 2020

(86) PCT No.: PCT/EP2020/075050
§ 371 (c)(1),
(2) Date: Mar. 25, 2022

(87) PCT Pub. No.: WO2021/058276
PCT Pub. Date: Apr. 1, 2021

(65) Prior Publication Data

US 2022/0373139 A1 Nov. 24, 2022

(30) Foreign Application Priority Data

Sep. 25, 2019 (FR) ...................................... 1910559

(51) Int. Cl.
*F17C 13/04* (2006.01)
*F17C 5/00* (2006.01)

(52) U.S. Cl.
CPC ................ *F17C 13/04* (2013.01); *F17C 5/00* (2013.01); *F17C 2205/0326* (2013.01);
(Continued)

(58) Field of Classification Search
CPC .. F17C 13/00; F17C 13/04; F17C 5/00; F17C 5/002; F17C 5/06; F17C 2205/0326;
(Continued)

(56) References Cited

U.S. PATENT DOCUMENTS 9,562,638 B2 * 2/2017 Tiberghien .............. F16L 37/18
10,612,724 B2 * 4/2020 Frenal ..................... F17C 13/04
(Continued)

FOREIGN PATENT DOCUMENTS

EP 0 238 312 9/1987
EP 2 783 152 10/2014
(Continued)

OTHER PUBLICATIONS

International Search Report for corresponding PCT/EP2020/075050, Dec. 1, 2020.

*Primary Examiner* — Nicolas A Arnett
(74) *Attorney, Agent, or Firm* — Elwood L. Haynes

(57) ABSTRACT

A conditioning device for engaging with a filling and/or tapping connector of a pressurized-fluid container cock, including a body bearing at least one coupling member arranged about a longitudinal axis, a locking member which is movable with respect to the body and with respect to the coupling member, a valve pusher which is movable in a gas transfer duct, and a blocking member, wherein the upstream face of the blocking member includes a tightness seal arranged about the longitudinal axis to form sealing between the gas transfer duct and an internal circuit of a filling connector.

15 Claims, 4 Drawing Sheets

(52) U.S. Cl.
CPC ............................ *F17C 2205/0329* (2013.01); *F17C 2205/037* (2013.01); *F17C 2205/0385* (2013.01); *F17C 2223/0123* (2013.01)

(58) Field of Classification Search
CPC ........ F17C 2205/0329; F17C 2205/037; F17C 2205/0385; F17C 2201/032; F17C 2201/056; F17C 2201/058; F17C 2223/0123; F17C 2223/036
See application file for complete search history.

(56) References Cited

U.S. PATENT DOCUMENTS

| | | | | |
|---|---|---|---|---|
| 10,718,455 | B2 * | 7/2020 | Danielson | F16L 37/1215 |
| 10,859,210 | B2 * | 12/2020 | Ligonesche | F17C 13/04 |
| 10,876,663 | B2 * | 12/2020 | Danielson | F16L 29/002 |
| 2013/0105037 | A1 * | 5/2013 | Frenal | F16K 1/308<br>141/386 |
| 2013/0174928 | A1 * | 7/2013 | Danielson | F16L 37/138<br>137/798 |
| 2014/0174594 | A1 * | 6/2014 | Frenal | F17C 5/06<br>141/4 |
| 2016/0010798 | A1 * | 1/2016 | Hori | F17C 5/06<br>137/565.23 |
| 2018/0038552 | A1 * | 2/2018 | Frenal | F17C 7/00 |
| 2018/0045373 | A1 * | 2/2018 | Frenal | F17C 7/00 |
| 2021/0140587 | A1 * | 5/2021 | Takezawa | F16L 37/121 |

FOREIGN PATENT DOCUMENTS

| | | |
|---|---|---|
| EP | 2 737 234 | 12/2015 |
| EP | 2 802 799 | 12/2016 |
| FR | 2 962 520 | 1/2012 |
| FR | 2 992 750 | 12/2013 |
| WO | WO 2016 139405 | 9/2016 |
| WO | WO 2016 139418 | 9/2016 |
| WO | WO 2019 150650 | 8/2019 |

* cited by examiner

[Fig. 1]
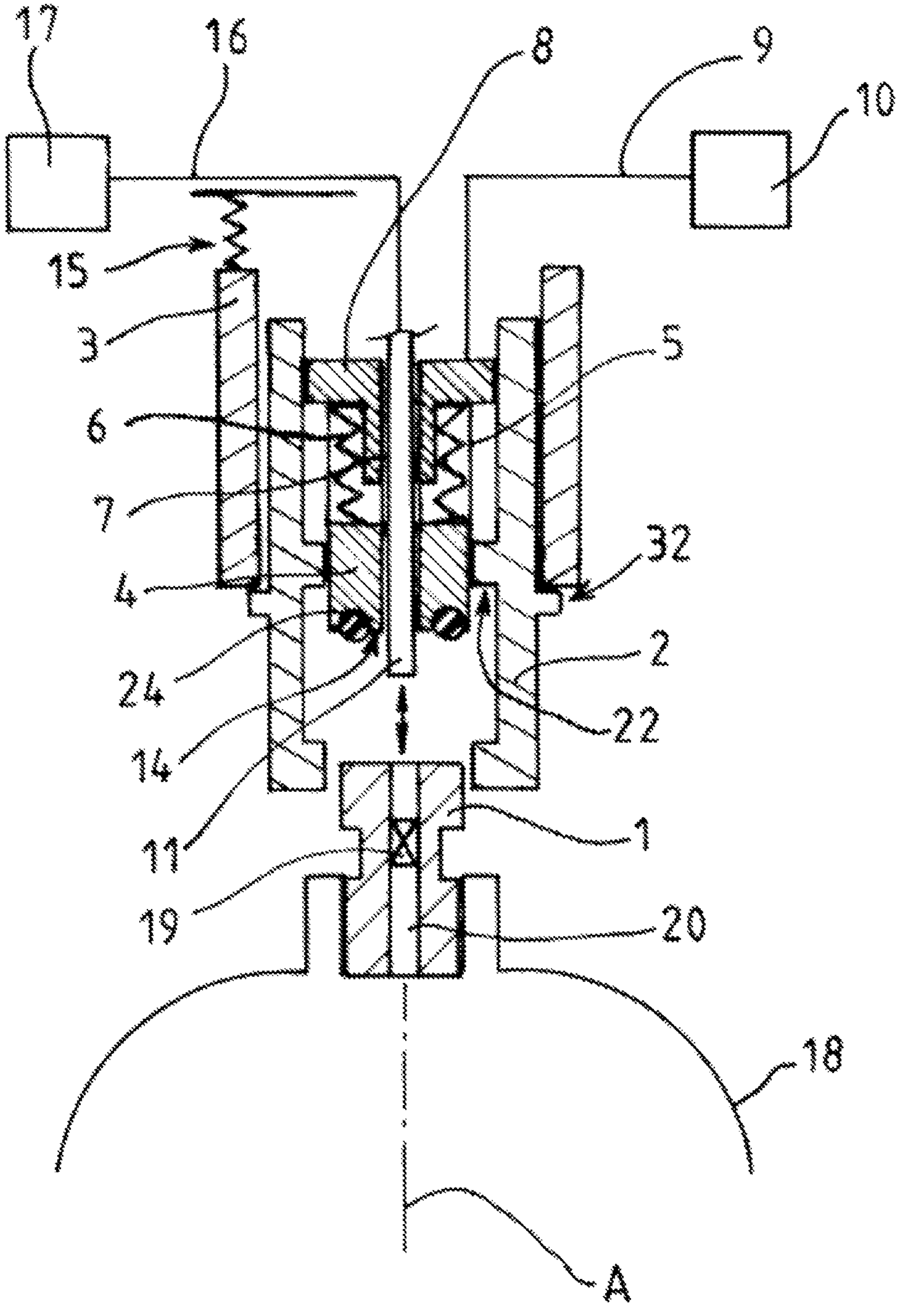

[Fig. 2]
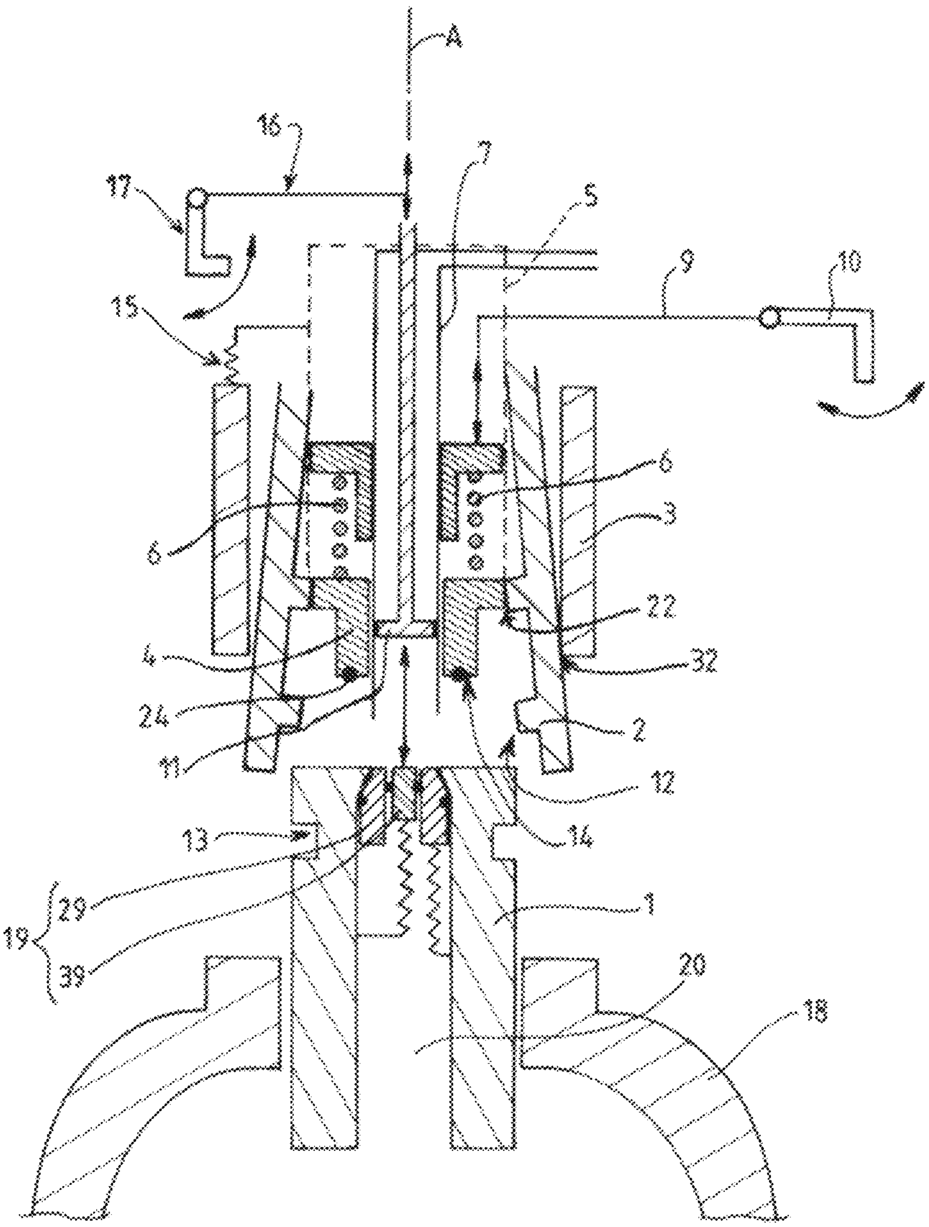

[Fig. 3]
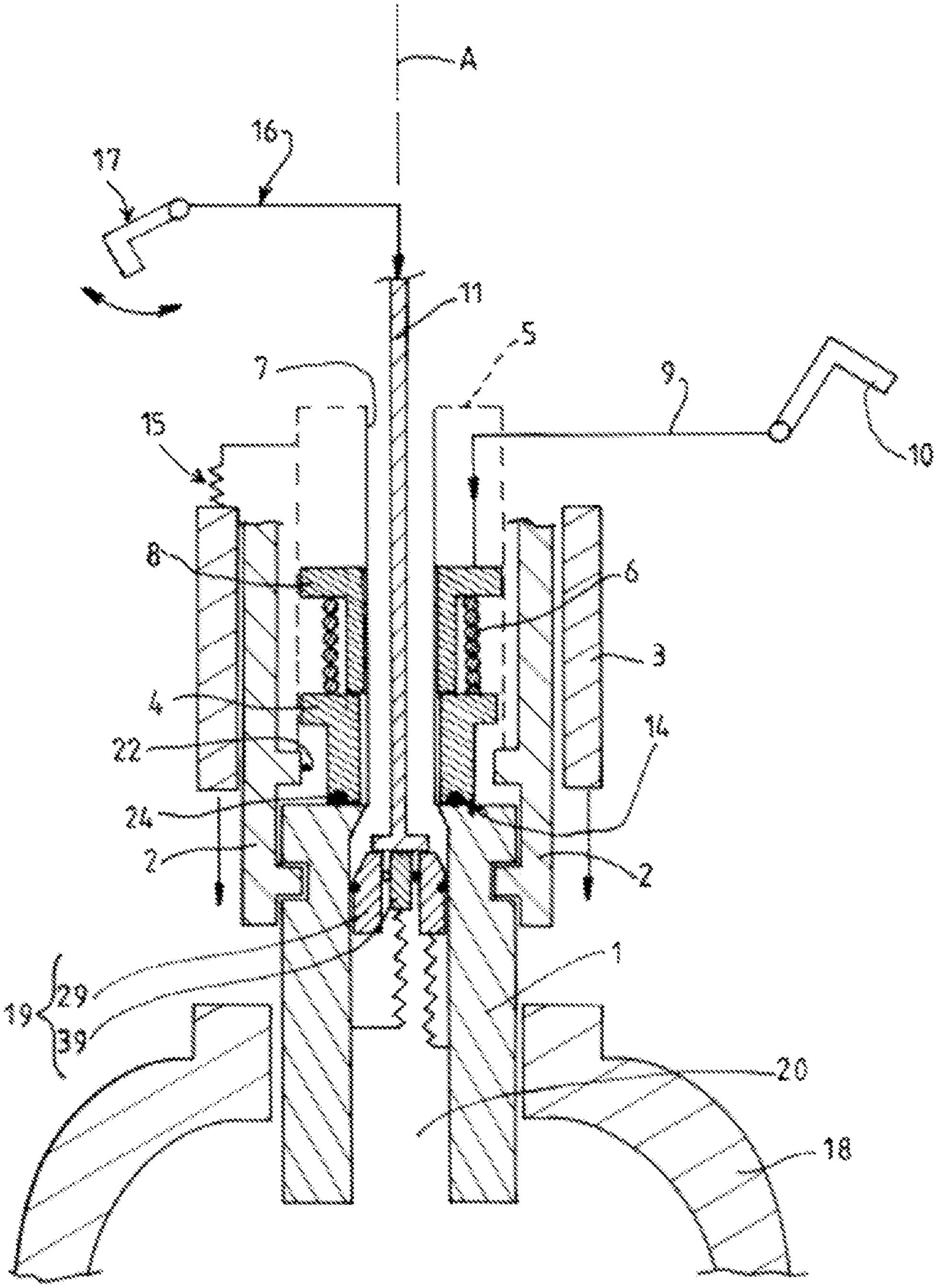

[Fig. 4]
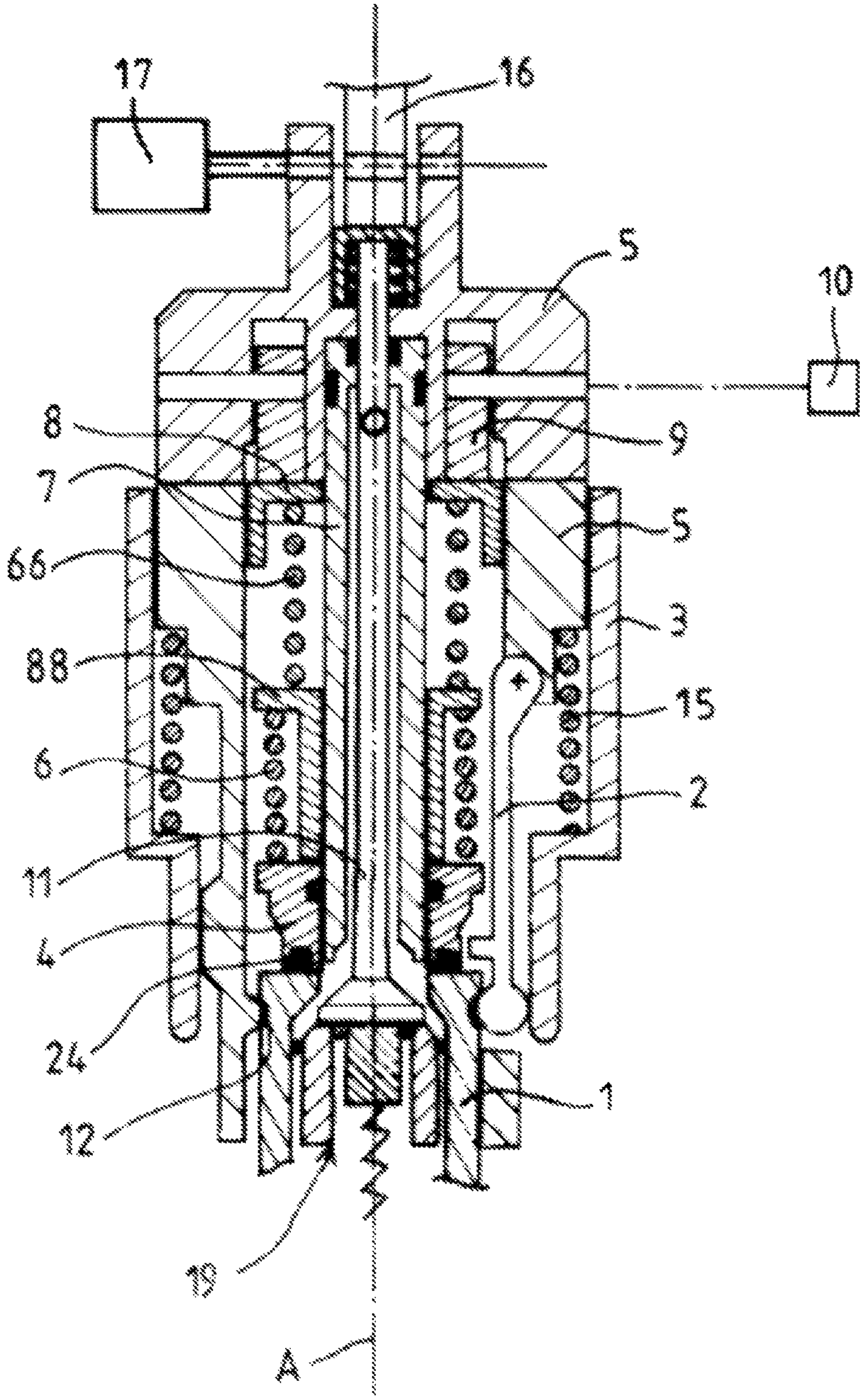

PACKAGING DEVICE, ASSEMBLY COMPRISING SUCH A DEVICE AND A CONTAINER, USE THEREOF AND A METHOD FOR FILLING OR WITHDRAWING

CROSS REFERENCE TO RELATED APPLICATIONS

This application is a 371 of International Application No. PCT/EP2020/075050, filed Sep. 8, 2020, which claims priority to French Patent Application No. 1910559, filed Sep. 25, 2019, the entire contents of which are incorporated herein by reference.

BACKGROUND

The invention relates to a conditioning device, to an assembly comprising such a device and a container, to its use and to a filling or tapping method.

The invention relates more particularly to a conditioning device intended for engaging with a filling and/or tapping connector of a pressurized-fluid container cock, the conditioning device comprising a body bearing at least one coupling member arranged about a longitudinal axis, the central space situated between the at least one coupling member and the longitudinal axis forming a housing intended to accommodate a filling connector of cylindrical general shape, the at least one coupling member being movable between a moved-away position to allow the introduction of a connector into the central space or the exit of a connector from the central space, and a moved-in position to ensure coupling of the at least one coupling member with the filling connector, the conditioning device comprising a locking member which is movable with respect to the body and with respect to the coupling member or members between a first active position blocking the at least one coupling member in the moved-in position, and a second inactive position allowing the movement of the at least one coupling member towards the moved-away position, the conditioning device comprising a valve pusher which is movable in a gas transfer duct along the longitudinal axis in order to actuate the opening of at least one valve of a filling connector, the conditioning device additionally comprising a blocking member, the blocking member being movable in a direction parallel to the longitudinal axis between a first upstream position preventing the movement of the at least one coupling member from its moved-away position towards its moved-in position, and a second downstream position allowing the movement of the at least one coupling member from the moved-away position towards the moved-in position, the blocking member being urged by default towards its working position by a return member, the blocking member comprising an upstream face intended to come into contact with a terminal end of a filling connector, the blocking member being movable from its working position towards its rest position during a pushing force of the filling connector on its upstream face when a filling connector penetrates into the central space of the conditioning device.

The invention relates in particular to a mechanism for rapidly connecting a conditioning (filling and/or tapping) device (or clamp) to a connector of a gas cylinder in order to allow the filling (or a tapping) of said cylinder.

Such devices are described for example in documents FR2962520A1 and EP2737234A1.

These devices describe satisfactory solutions for carrying out filling (or tapping) operations through a connector comprising an isolation valve housed in the connector (separating the high pressure from the external atmosphere) and an anti-dust valve which is flush with the end of the connector.

In the case where the isolation valve separating the high pressure from the external atmospheric pressure is situated at the end of the connector (in particular when it is flush at the terminal end of the connector), the architectures mentioned above are not suitable for realizing a secure fluid-tight connection. For example, for a filling connector of the type described in document EP2783152A1 (two concentric valves flush with the terminal end of the connector), the conditioning tools described above are poorly suited.

SUMMARY

One aim of the present invention is to overcome all or some of the disadvantages of the prior art stated above.

To this end, the conditioning device according to the invention, otherwise conforming to the generic definition given thereof by the preamble above, is essentially characterized in that the upstream face of the blocking member comprises a tightness seal arranged about the longitudinal axis to form sealing between the gas transfer duct and an internal circuit of a filling connector. Moreover, embodiments of the invention may comprise one or more of the following features:

- the tightness seal of the upstream face of the blocking member is an O-ring compression seal,
- the device comprises a pushing member for pushing the blocking member, the pushing member being movable in a direction parallel to the longitudinal axis between a first downstream position and a second upstream position, the conditioning device additionally comprising an actuating device for actuating the pushing member that is configured to control the movement of the pushing member between its first and second positions,
- the pushing member comprises a face forming a stop for the return member urging the blocking member towards its working position, towards the upstream side,
- the actuating device for actuating the pushing member is of the mechanical and/or pneumatic and/or magnetic and/or hydraulic type and comprises a manually and/or automatically actuatable switch,
- the actuating device for actuating the pushing member comprises a switch formed by a push-button or by a pivoting lever and a mechanism for the transmission of force between the switch and the pushing member,
- the locking member is urged towards its active position by a return member such as a spring,
- the locking member is movable in translation in a direction parallel to the longitudinal axis when the at least one coupling member is in the moved-away position, a stop preventing the passage of the locking member from the inactive position towards the active position when the at least one coupling member is in the moved-in position, the passage of the locking member from the inactive position towards the active position not being impeded by the stop,
- the conditioning device comprises an actuating device for actuating the valve pusher of the mechanical and/or pneumatic and/or magnetic and/or hydraulic type, said actuating device comprising a manually and/or automatically actuatable actuator,
- the actuating device for actuating the valve pusher comprises a switch formed by a push-button or a pivoting lever and a mechanism for the transmission of force between the switch and the valve pusher, the method comprises a step of locking the at least one coupling member in the moved-in position via a movable locking member of the conditioning device, the conditioning device comprises coupling members formed by a plurality of claws, the inner face of the claws which face towards the central space intended to accommodate a filling connector being provided with reliefs and/or with recesses of determined dimensions, the reliefs and/or recesses being spaced relatively from one another in a determined manner in order to fit into mating grooves and/or reliefs formed on the outer face of a filling connector, the locking member comprises a sleeve of tubular general shape arranged around the at least one coupling member, the locking of the at least one coupling member in the moved-in position is effected automatically by the movement of the movable locking member of the conditioning device under the action of the return member, the conditioning device comprises a device for locking/unlocking the actuating device for actuating the valve pusher preventing the movement of the valve pusher as long as the blocking member is not clamped or pushed against the terminal face of said connector via the movable pushing member controlled by an actuating device, the conditioning device comprises an anti-unlocking device preventing the movement of the pushing member from its upstream position towards its downstream position as long as the pressure in the circuit and/or in the transfer duct is greater than a determined pressure, the conditioning device comprises an anti-unlocking device preventing the movement of the locking member from its active position towards its inactive position as long as the pressure in the circuit and/or in the transfer duct is greater than a determined pressure, the connector comprises a valve for closing the internal circuit which, in the closure position of the internal circuit, is flush at the terminal end of the connector, with, in the closure position of the internal circuit, the closure valve separating the high pressure from the external atmosphere, the closure valve is a double valve with two concentric closure elements: an inner closure element whose opening allows the tapping of gas from the internal circuit of the connector, and an outer closure element whose opening allows filling by introduction of gas into the internal circuit of the connector.

The invention also relates to an assembly comprising a pressurized-fluid container provided with a filling and/or tapping connector and a conditioning device according to any one of the features above or below, the connector comprising a body of cylindrical general shape extending along a longitudinal axis and the outer surface of which comprises coupling members intended to engage with the coupling members of the conditioning device in order to allow removable coupling between these two entities, the filling connector comprising an internal circuit accommodating at least one valve for closing the internal circuit, said internal circuit opening at a terminal face of said filling connector.

The invention also relates to the use of a conditioning device according to any one of the features above or below or of an aforementioned assembly for filling and/or tapping a pressurized-fluid container, in particular a pressurized-gas cylinder.

The invention also relates to a method for filling or tapping a container with pressurized fluid, the container comprising a cock provided with a filling connector having a body of cylindrical general shape extending along a longitudinal axis and the outer surface of which comprises coupling members intended to engage with the coupling members of the conditioning device in order to allow removable coupling between the filling device and said connector, the filling connector comprising an internal circuit accommodating at least one valve for closing the internal circuit, said internal circuit opening at a terminal face of said filling connector, the method comprising a mechanical connection, on the connector, of a conditioning device according to any one of the features above or below, the mechanical connection comprising a step of contact between the blocking member and the terminal face of said filling connector, in which step the tightness seal of the blocking member provides sealing between the duct of the conditioning device and the internal circuit of the filling connector, the method additionally comprising a step of moving the blocking member towards its rest position by relative drawing-together between the conditioning device and the filling connector, and a step of moving the at least one coupling member from its moved-away position towards its moved-in position with coupling on the body of the filling connector.

According to other possible particular features:

the method comprises a step of clamping by pushing the blocking member against the terminal face of said connector via a pushing force provided by a movable pushing member controlled by the actuating device, the filling method comprises a step of verifying the sealing between the filling device and the filling connector (1) via the duct (7) of the conditioning device being placed under vacuum before the opening of the circuit (20) of the filling connector, the method comprises, after the filling step, a step of closing the circuit (20) of the filling connector and a step of purging said circuits (7, 20), the step of clamping the blocking member against the terminal face of the filling connector is carried out automatically or manually, in particular by actuating a lever with cam(s) acting on a spring for urging the blocking member.

The invention may also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 represents a schematic and partial sectional view illustrating the structure and the operation of a first exemplary embodiment of an assembly comprising a conditioning device and a fluid container, FIG. 2 represents a schematic and partial sectional view illustrating the structure and the operation according to a second exemplary embodiment of an assembly comprising a conditioning device and a fluid container in a detached configuration, FIG. 3 represents a similar setup to that of FIG. 2 in a connected configuration, FIG. 4 represents a schematic and partial sectional view illustrating the structure and the operation according to a third exemplary embodiment of an assembly comprising a conditioning device and a fluid container in a connected configuration.

DETAILED DESCRIPTION OF PREFERRED EMBODIMENTS

The illustrated conditioning device is intended to engage with a filling (and/or tapping) connector 1 of a cock of a pressurized-fluid container 18.

This conditioning device comprises a body 5 bearing at least one coupling member 2 arranged about a longitudinal axis A. As illustrated and described in more detail below, the conditioning device can comprise a plurality of coupling members formed by movable claws.

The surface of the claws 2 that faces towards the central space intended to accommodate a filling connector 1 can be provided with one or more reliefs 12 and/or recesses of determined dimensions. These one or more reliefs 12 and/or recesses are spaced relatively from one another in a predetermined manner in order to fit into one or more mating grooves 13 and/or reliefs formed on the outer face of a filling connector 1.

Of course, any other suitable coupling member can be envisaged (balls, etc.).

The central space situated between the coupling claws 2 and the longitudinal axis A forms a housing intended to accommodate a filling connector 1 of cylindrical general shape.

The coupling claws 2 are movable between a moved-away position (FIG. 2) to allow the introduction of a connector 1 into the central space or the exit of a connector 1 from the central space, and a moved-in position (FIG. 3 or FIG. 4) to ensure coupling of the coupling claws 2 with the filling connector 1.

The conditioning device additionally comprises a locking member 3 which is movable with respect to the body 5 and with respect to the coupling claws 2 between a first active position blocking the at least one coupling member 2 in the moved-in position (FIG. 4 for example), and a second inactive position allowing the movement of the coupling claws 2 towards the moved-away position (FIG. 1) or FIG. 2 for example).

As illustrated, the locking member 3 can be movable in translation (in a direction parallel to the longitudinal axis A) between the first active position and the second inactive position. Moreover, preferably, the locking member 3 is urged towards its active position by a return member 15 such as a spring. Moreover, when the coupling claws 2 are in the moved-away position, a stop 32 can prevent the passage of the locking member 3 from the inactive position towards the active position (cf. FIG. 1 or FIG. 2). Conversely, when the coupling claws 2 are in the moved-in position, the passage of the locking member 3 from the inactive position towards the active position is no longer impeded by the stop 32 (cf. FIG. 3 or FIG. 4). As illustrated, this stop can be formed by or on one or more of the claws 2.

For example, the locking member comprises or is formed by a sleeve 3 of tubular general shape arranged around the coupling claws 2.

The conditioning device additionally comprises a valve pusher 11 which is movable in a gas transfer duct 7 (for filling from downstream to upstream and, where appropriate, for tapping from upstream to downstream) along the longitudinal axis. The terms upstream and downstream make reference to the direction of flow of the fluid in the case of tapping fluid from the connector 1 in the longitudinal direction A. The valve pusher comprises a rigid pin which is movable in translation along the longitudinal axis A in order to optionally actuate the opening of at least one valve 19 of a filling connector 1.

Conventionally, the actuating device 16, 17 for actuating the valve pusher 11 can comprise a switch 17 formed by a push-button or a pivoting lever and a mechanism 16 for the transmission of force between the switch 17 and the valve pusher 11. For example, a pivoting lever 17 can control the position of the valve pusher 11 via a cam 16.

The conditioning device additionally comprises a blocking member 4 for blocking the claws 2.

The blocking member 4 is for example mounted on the body 5 around the (upstream) terminal end of the transfer duct 7. The blocking member 4 is movable in translation in a direction parallel to the longitudinal axis A between a first upstream position preventing the movement of the coupling claws 2 from the moved-away position towards the moved-in position (cf. FIG. 1 or FIG. 2 for example while ensuring their spacing), and a second downstream position allowing the movement of the coupling claws 2 from the moved-away position towards the moved-in position (cf. FIG. 3 or FIG. 4 for example where the spacing is not maintained).

The blocking member 4 can therefore form, depending on its position, an optional mechanical stop ensuring optional spacing of the coupling members 2 in order to optionally prevent the mechanical connection of the conditioning device on a connector 1.

The blocking member 4 is urged by default towards its working position by a return member 6, for example a spring. This blocking member 4 comprises an upstream face 14 intended to come into contact with a terminal end of a filling connector 1 during the connection of these two entities.

The blocking member 4 is movable from its working position (upstream, cf. FIG. 2) towards its rest position (further downstream, cf. FIG. 3) during a pushing force of the filling connector 1 on its upstream face. That is to say that when the conditioning device is pressed onto the terminal end of a connector 1, the filling connector 1 penetrates into the central space of the conditioning device and pushes back this blocking member 4 towards the downstream side.

According to an advantageous particular feature, the upstream face of the blocking member 4 comprises a tightness seal 24 arranged about the longitudinal axis A to form sealing between the gas transfer duct 7 and an internal circuit 20 of the filling connector 1.

Thus, this blocking member 4 provides a double function: a role in the mechanism for locking the rapid connection between the conditioning device and the filling connector 1, and a role of sealing in this connection. As explained in more detail below, the blocking member 4 makes it possible in particular to provide sealing of the connection from the start of the actuation of the rapid connection and in particular during its retreat towards the downstream side in order to release the coupling claws 2. As such, the blocking member 4 can be considered to be a part of the mechanism for locking the rapid connection with the connector 1. The blocking member 4 therefore participates simultaneously in the condition of connecting a conditioning device with the connector 1 and in their sealing.

This blocking member 4 moves aside and allows the mechanical connection only when satisfactory sealing is produced.

The tightness seal 24 of the upstream face of the blocking member 4 is for example an O-ring compression seal which can be situated in a housing such as a circular groove of the upstream end of the blocking member 4.

For example, as illustrated, in its first upstream position, the blocking member 4 forms a stop engaging with a portion 22 of the coupling claws 2, preventing them from moving in. Conversely, in its second downstream position, the blocking member 4 moves aside transversely in order to allow the coupling claws 2 to move in.

Preferably, the locking of the coupling of the conditioning device on the filling connector 1 can be carried out automatically. For example, an operator or a machine drives down the conditioning device onto the filling connector 1. During this connection, there is contact between the blocking member 4 and the terminal face of said filling connector 1, in which the tightness seal 24 of the blocking member 4 provides sealing between the duct 7 of the conditioning device and the internal circuit 20 of the filling connector 1. During this driving operation, the blocking member 4 is pushed back towards its rest position by relative drawing-together between the conditioning device and the filling connector 1. This frees the movement of the locking claws 2, which can be constrained to pass from the moved-away position towards the moved-in position by the force of the locking member 3 pushed by its spring 5. When the locking claws 2 are moved in (coupling on the body of the filling connector 1), they no longer impede the movement of the locking member 3, which can then pass from its inactive position to its active locking position under the action of the return member 15 (cf. FIG. 3 or FIG. 4).

As illustrated, the conditioning device preferably comprises a pushing member 8 for pushing the blocking member 4 that makes it possible in particular to increase the pressing force of the blocking member 4 on the filling connector 1 (and therefore the strength of the sealing provided by the seal 24). The blocking member 4 can therefore perform an additional function of maintaining the sealing under an increased pressure.

This pushing member 8 is a part having the general shape for example of a disc or of a cup or of a cap. This pushing member 8 is mounted so as to be movable in a direction parallel to the longitudinal axis A between a first downstream position and a second upstream position. These two positions generate forces of different intensity on the blocking member 4 in the upstream direction. The conditioning device additionally comprises an actuating device 9, 10 for actuating the pushing member 8 that is configured to control the movement of the pushing member 8 between its first and second positions. For example, this actuating device 9, 10 is of the mechanical and/or pneumatic and/or magnetic and/or hydraulic type and comprises a manually and/or automatically actuatable switch 10. Preferably, this actuating device 9, 10 for actuating the pushing member 8 comprises a switch 10 formed by a push-button or a pivoting lever and a mechanism 9 for the transmission of force between the switch 10 and the pushing member 8.

In one possible embodiment, the movement of the pushing member 8 could be controlled automatically, for example according to the state of mechanical connection between the conditioning device and the connector 1 (claws 2 and locking member 3).

As illustrated, the pushing member 8 preferably comprises a face forming a stop or the bearing point for an end of the return member 6 which urges the blocking member 4 towards its working position. Thus, when the pushing member 8 is moved into its second upstream position, the force exerted by the spring 6 on the blocking member 4 in the upstream direction is increased. In the embodiment of FIG. 4, two springs 6, 60 in series act on the pushing member 8. A first upstream spring 6 is mounted between the blocking member 4 and a first cup 88, and a second downstream spring 66 is mounted between the first cup 88 and the pushing member 8.

The conditioning device is preferably used for filling pressurized-gas containers (cylinder or bundle accommodating a set of cylinders). Of course, it can also be used for tapping gas from a filling connector 1 which performs both the filling function and the tapping function.

Thus, the conditioning device can form part of or constitute, where appropriate, a gas-tapping cock which can be removably connected to a tapping and/or filling connector 1. In particular, the filling connector 1 can comprise a closure valve 19 which is a double valve with two concentric closure elements (an inner closure element 39 whose opening allows tapping of gas from the internal circuit of the connector 1, and an outer closure element 29 whose opening allows filling by introduction of gas into the internal circuit of the connector 1).

In this case, the conditioning device can be configured to ensure the opening of the two concentric elements by actuating for example the outer closure element 29 for a filling operation (introduction of fluid into the connector 1). Of course, the same conditioning device architecture can be configured to ensure the opening only of the inner element 39 for tapping fluid (exit of fluid from the connector 1).

Likewise, the conditioning device can be configured to ensure the opening of a single closure valve 19 (optionally in series with one or more other valves situated in the internal circuit 20 of the connector 1).

Thus, the conditioning device allows a mechanical connection with reliable sealing which can, where appropriate, be reinforced in the case of the presence of a pushing member 8 for pushing the blocking member 4.

The mechanical and fluidic connection can be produced according to the following sequence:

- the conditioning device is fitted over the filling connector 1, thereby providing sealed contact between the blocking member 4 and the inlet of the internal circuit 20 of the connector 1,
- the retreat of the blocking member 4 towards the downstream side frees the coupling members 2 which can couple against the body of the connector 1, this automatically freeing the movement of the member 3 which secures and locks the mechanical connection,
- the tightness seal 24 of the blocking member 4 is placed under an increased pressure via the actuation of the switch 10 of the device for actuating the position of the pushing member 8 (for example via a lever and cam(s) and the spring 6),
- if required, the sealing of the connection can be controlled by placing the assembly under vacuum,
- the isolation valve or valves 19 of the connector 1 can then be opened via the valve pusher 11 controlled by a switch 10 (a second lever for example acting via a cam on the valve pusher housed in the transfer duct 7),
- the gas transfer can then be carried out between the two connected entities.

After gas transfer, the disconnection can be carried out according to the following sequence:

the isolation valve or valves 19 of the connector 1 can be closed via the movement of the valve pusher 11 in the opposite direction (towards the downstream side) via the switch 10, the internal circuit 20 can be purged, the squashing force of the tightness seal 24 of the blocking member 4 is reduced via the actuation of the switch 10 of the device (movement of the pushing member 8 in the opposite direction), the mechanical connection between the conditioning device and the connector 1 can be unlocked by the movement of the locking member 3 and the moving away of the coupling members 2.

Of course, the invention is not limited to the exemplary embodiments described above. Thus, for example, there can be provided a mechanism or device for locking/unlocking the switch 17 for controlling the valve pusher 11 that prevents its actuation (and therefore prevents the opening of the valves 19) as long as the tightness seal 24 of the blocking part is not placed under pressure (via the actuator 10). This can be provided via a mechanical and/or hydraulic and/or pneumatic and/or magnetic system. For example, the actuation of the two actuators 10, 17 can be coupled, and in particular the actuator 17 is accessible or movable only if the other actuator 10 is in the required position. In a variant, the two operations (placing the seal 24 under pressure and opening the valves 19) can be sequential and provided by one and the same switch (lever or some other means).

Likewise, there can be provided a mechanism or device for locking/unlocking the pressurization of the tightness seal 24 (and optionally of the locking member 3) according to the pressure in the circuit(s) 7, 20. That is to say for example that the member 8 cannot return to its first downstream position if the system detects a pressure above a determined threshold in the circuits (signifying for example that the valve 19 is not closed). The same likewise applies to the locking member 3 which could be blocked in its first active position as long as the pressure in the circuits 7, 20 is above a determined threshold.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A conditioning device for engaging with a filling and/or tapping connector of a pressurized-fluid container cock, the conditioning device comprising:

a body bearing at least one coupling member arranged about a longitudinal axis, a central space situated between the at least one coupling member and the longitudinal axis forming a housing configured to accommodate a filling connector of cylindrical general shape, the at least one coupling member being movable between a moved-away position to allow the introduction of a connector into the central space or the exit of a connector from the central space, and a moved-in position to ensure coupling of the at least one coupling member with the filling connector, a locking member which is movable with respect to the body and with respect to the coupling member or members between a first active position blocking the at least one coupling member in the moved-in position, and a second inactive position allowing the movement of the at least one coupling member towards the moved-away position, a valve pusher which is movable in a gas transfer duct along the longitudinal axis in order to actuate the opening of at least one valve of a filling connector, a blocking member, the blocking member being movable in a direction parallel to the longitudinal axis between a first upstream position preventing the movement of the at least one coupling member from the moved-away position towards the moved-in position, and a second downstream position allowing the movement of the at least one coupling member from the moved-away position towards the moved-in position, the blocking member being urged by default towards the first working upstream position by a return member, the blocking member comprising an upstream face configured to come into contact with a terminal end of a filling connector, the blocking member being movable from the first upstream position towards the second downstream position during a pushing force of the filling connector on the upstream face when said filling connector penetrates into the central space of the conditioning device, wherein the upstream face of the blocking member comprises a tightness seal arranged about the longitudinal axis to form sealing between the gas transfer duct and an internal circuit of a filling connector.

2. The conditioning device according to claim 1, wherein the tightness seal of the upstream face of the blocking member is an O-ring compression seal.

3. The conditioning device according to claim 1, further comprising a pushing member for pushing the blocking member, the pushing member being movable in a direction parallel to the longitudinal axis between a first downstream position and a second upstream position, the conditioning device further comprising an actuating device for actuating the pushing member that is configured to control the movement of the pushing member between the first and second positions.

4. The conditioning device according to claim 3, wherein the pushing member comprises a face forming a stop for the return member urging the blocking member towards the first upstream position, towards the upstream side.

5. The conditioning device according to claim 3, wherein the actuating device for actuating the pushing member is of the mechanical and/or pneumatic and/or magnetic and/or hydraulic type and comprises a manually and/or automatically actuatable switch.

6. The conditioning device according to claim 5, wherein the actuating device for actuating the pushing member comprises the switch which is formed by a push-button or by a pivoting lever and a mechanism for the transmission of force between the switch and the pushing member.

7. The conditioning device according to claim 1, wherein the locking member is urged towards the active position by a return member.

8. The conditioning device according to claim 7, wherein the locking member is movable in translation in a direction parallel to the longitudinal axis, and in that, when the at least one coupling member is in the moved-away position, a stop prevents the passage of the locking member from the inactive position towards the active position, and in that, when the at least one coupling member is in the moved-in position, the passage of the locking member from the inactive position towards the active position is not impeded by the stop.

9. The conditioning device according to claim 1, further comprising an actuating device for actuating the valve pusher of the mechanical and/or pneumatic and/or magnetic and/or hydraulic type, said actuating device comprising a manually and/or automatically actuatable actuator.

10. The conditioning device according to claim 9, wherein the actuating device for actuating the valve pusher comprises a switch formed by a push-button or a pivoting lever and a mechanism for the transmission of force between the switch and the valve pusher.

11. An assembly comprising a pressurized-fluid container provided with a filling and/or tapping connector and a conditioning device according to claim 1, the connector comprising a body of cylindrical general shape extending along a longitudinal axis and the outer surface of which comprises coupling members configured to engage with the coupling members of the conditioning device in order to allow removable coupling between these two entities, the filling connector comprising an internal circuit accommodating at least one valve for closing the internal circuit, said internal circuit opening at a terminal face of said filling connector.

12. A method for filling or tapping a container with pressurized fluid, the container comprising a cock provided with a filling connector, the method comprising a mechanical connection, on the connector, of a conditioning device according claim 1, the filling connector having a body of cylindrical general shape extending along a longitudinal axis and the outer surface of which comprises coupling members configured to engage with coupling members of the conditioning device in order to allow removable coupling between the filling device and said connector, the filling connector comprising an internal circuit accommodating at least one valve for closing the internal circuit, said internal circuit opening at a terminal face of said filling connector, wherein the mechanical connection comprises a step of contact between the blocking member and the terminal face of said filling connector, in which step the tightness seal of the blocking member provides sealing between the duct of the conditioning device and the internal circuit of the filling connector, the method additionally comprising a step of moving the blocking member towards the rest position by relative drawing-together between the conditioning device and the filling connector, and a step of moving the at least one coupling member from the moved-away position towards the moved-in position with coupling on the body of the filling connector.

13. The method according to claim 12, further comprising a step of clamping by pushing the blocking member against the terminal face of said connector via a pushing force provided by a movable pushing member controlled by an actuating device.

14. The method according to claim 13, further comprising a step of locking the at least one coupling member in the moved-in position via a movable locking member of the conditioning device.

15. The method according to claim 13, further comprising a step of moving the valve pusher of the conditioning device in the upstream direction via an actuating device in order to open at least one closure valve of the internal circuit of the filling connector.

* * * * *